April 8, 1952    W. F. ENGEL    2,592,016
DOUBLE-IMPREGNATION METHOD OF
PRODUCING A PELLETED CATALYST
Filed Nov. 15, 1949
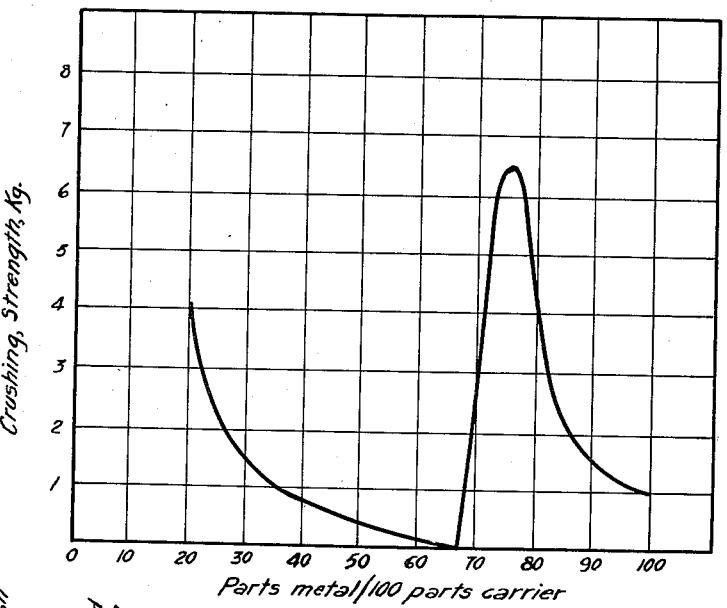
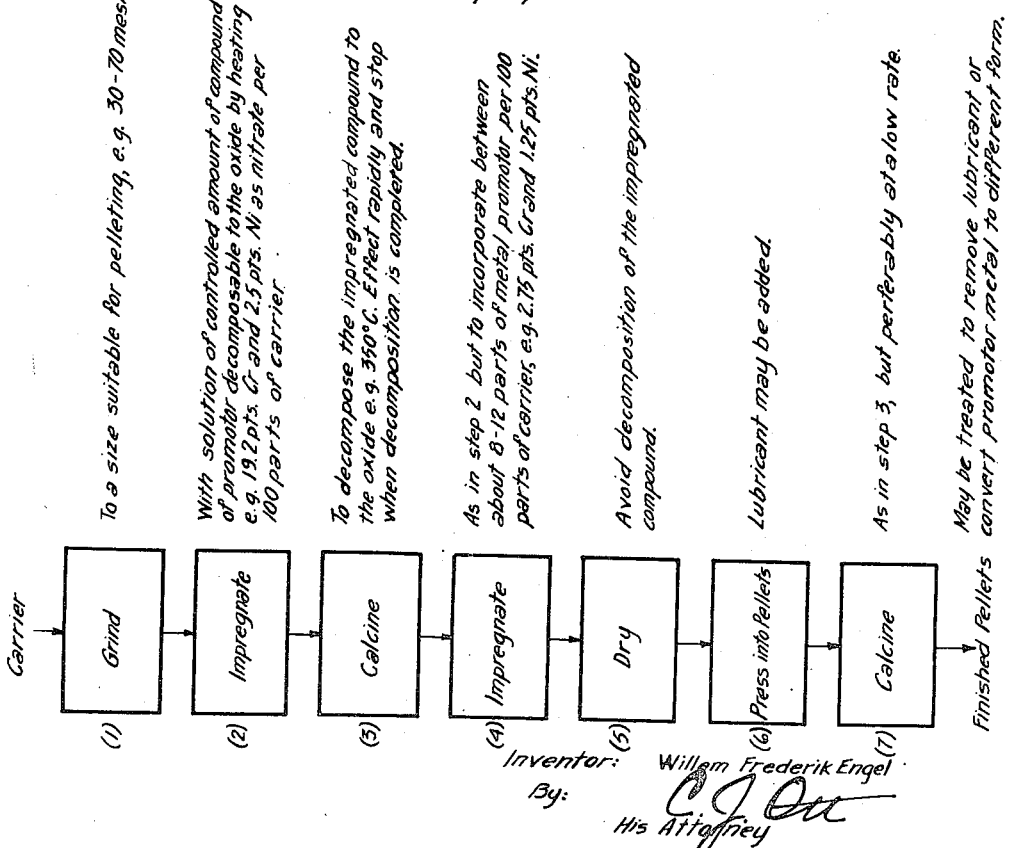
Inventor: Willem Frederik Engel
By: His Attorney Patented Apr. 8, 1952

2,592,016

UNITED STATES PATENT OFFICE 2,592,016

DOUBLE-IMPREGNATION METHOD OF PRODUCING A PELLETED CATALYST

Willem Frederik Engel, Amsterdam, Netherlands, assignor to Shell Development Company, San Francisco, Calif., a corporation of Delaware Application November 15, 1949, Serial No. 127,348
In the Netherlands December 29, 1948

4 Claims. (Cl. 252—472)

This invention relates to the production of formed pellets of impregnated type catalysts. More particularly, the invention relates to an improved method for the production of exceptionally strong pellets of catalysts containing a high concentration of active ingredients impregnated in a relatively inert carrier material.

While many solid catalytic elements and compounds may be used in their natural state, most solid catalytic elements and compounds are more advantageously employed in combination with a relatively inert carrier or support material. In preparing catalysts of this type there are several distinct ways of combining the active catalytic agents and the relatively inert support or carrier material. The most important of these ways are the following:

1. Co-precipitation of the two or more materials, e. g., co-precipitation of molybdena and alumina.
2. Separate precipitation of the two or more materials followed by mixing the fresh precipitates, e. g., separate precipitation of alumina and silica and mixing of the hydrous oxides.
3. Precipitation of the active catalytic material onto the suspended carrier material, e. g., precipitation of nickel carbonate in the presence of suspended kieselguhr.
4. Impregnation of the carrier material with a solution of a soluble compound of the active catalyst followed by calcination to convert the soluble compound to an insoluble form, e. g., impregnation of alumina with ammonium molybdate followed by calcination to convert the ammonium molybdate to molybdenum oxide.
5. Simple mixing of the powdered ingredients, e. g., finely powdered metal carbonate and pumice.

In most cases the properties and efficiencies of the resulting catalyst are largely dependent upon the method of preparation and the various methods are rarely equivalent. The above mentioned method No. 4 is generally superior to the other methods in those cases where it can be applied and it is to this specific method that the present invention relates.

In a few cases it is desirable to employ the catalyst in the form of a fine powder, but in the majority of cases it is necessary or desirable to employ the catalyst in the form of pieces or fragments of relatively large size. In a few cases it is possible, when preparing catalysts of the impregnated type, to prepare the catalyst in pieces of approximately the desired size by simply impregnating pieces of the carrier metal of the approximate size desired. In most cases, however, it is necessary to form the catalyst into pieces of the desired size and shape. Aside from necessity, it is also advantageous in most cases to form the catalyst into pellets, since by this means uniform catalyst particles of the exact size and shape desired are produced. Such particles have several advantages; for example, the tendency for channeling and the tendency toward adverse wall effects are decreased. Also, for many reactions the size and shape of the catalyst particles are quite important. For example, in certain catalytic cracking reactions, the course of the reaction is materially altered merely by halving the size of the catalyst particles.

Formed catalyst particles of the desired size and shape may be produced by casting or other methods, but the method most generally used is that known as pelleting. There are two methods of pelleting. One method is to press the powdered material into a die in a pelleting machine such as the well-known Stokes machine. The other is to extrude the moist powder through a die and cut the extrudate into pieces of the desired length. In producing catalyst pellets by these two methods considerable difficulty is often, but not always, encountered in producing pellets which have sufficient mechanical strength. Either the pellets are initially easily broken or they become so after a short period of use. In the past this difficulty has practically excluded the use of many carrier materials which are otherwise very desirable, but form weak pellets. Also, in view of this difficulty, it has been necessary in many cases to add sodium silicate or other bonding agents and/or to sinter the resulting pellets to improve their strength and such expedients have in most cases reduced the efficiency of the resulting catalyst. This difficulty has been pronounced in the preparation of impregnated type catalysts. Thus, in order to secure pellets of suitable mechanical strength it has been necessary in most cases to employ only those carrier materials that are easily formed into mechanically strong and stable pellets.

When making pelleted catalysts through the methods 1, 2, 3 or 5 listed above, strong pellets containing almost any concentration of promoter can usually be formed if a suitable carrier material is chosen. When it is desired to incorporate the promoter with the carrier by impregnation (method 4), however, it is found that strong pellets are only formed when the concentration of promoter is quite small. As the concentration of promoter is increased the pellets become weaker and weaker. Thus, the impregnation method is generally limited in practice to the preparation of pelleted catalysts containing less than about 15% of the catalytic promoter material. It would be desirable in many cases to incorporate much larger amounts of the catalytically active agent by impregnation, but this has not been possible except possibly in rare cases, and when catalysts containing higher concentrations of active agent were wanted it was necessary to revert to one of the less desirable preparation methods, e. g., the mixing of the powdered ingredients or the precipitation of the active agent with the slurried carrier, which, incidentally, also involves pelleting difficulties in many instances.

I have now found that impregnated type catalysts containing high concentrations of the active catalytic agent may be produced in the form of pellets having exceptionally good mechanical strength by employing the following sequence of steps:

1. The relatively inert carrier material is ground to a powder suitable for pelleting.
2. The powdered, relatively inert carrier material is impregnated with a solution containing a certain part of the desired metal or metal promoter in the form of a compound decomposable to the oxide by heating.
3. The impregnated material is calcined to decompose the impregnated compound to the corresponding metal oxide.
4. The impregnated and calcined material is impregnated with a further specific amount of the metal or mixture of the metal promoter in the form of a water soluble compound decomposable to the oxide by heating.
5. The impregnated material is dried under conditions to avoid decomposition of the impregnated material.
6. The dried, impregnated material is pressed into pellets of the desired size and shape, if desired with the aid of graphite or a similar lubricant.
7. The pellets are calcined to decompose the impregnated compound or compounds to the oxide.

The sequence of these steps is shown in the attached process diagram.

While the above lists the sequence of steps preferably followed in producing the catalyst pellets according to the invention, the steps are broadly stated. Various details of the steps are also of importance. These details will be pointed out in the following:

Step 1

It is necessary that the relatively inert carrier material be brought to a sufficiently finely divided state to be pelleted. The degree of fineness is of some importance but is not critical. The maximum coarseness is determined by the ability of the material to be fed to the pelleting machine. This depends somewhat upon the size of the pellets being formed but is usually quite coarse. There is no limit to the fineness. However, if the material is very finely ground it may be necessary in some cases to resort to slugging. In this field the term "slugging" refers to the practice sometimes applied with difficultly pelletable materials of subjecting the material to a very rough or superficial pelleting operation followed by crushing into fragments of a suitable size and re-pelleting the fragments. It is desirable where possible to avoid this operation. In general, it is sufficient to simply grind the material until it flows freely through the fingers; 30-100 mesh material is well suited, but the material may be either coarser or finer.

It is preferred that the material be in the form of a powder or relatively small fragments during the following impregnation step but this is not essential. Thus, while it is desirable to grind the material first, it may be ground at any stage prior to pelleting. In some cases the relatively inert carrier material is obtained in commerce in a finely divided state and in such cases it is, of course, unnecessary to subject the material to a special grinding treatment.

Step 2

In the second step the relatively inert carrier material is impregnated with a compound of the metal or mixture of metals of the active catalytic promoter which compound may be converted to the corresponding oxide by heating. This impregnation step may be carried out in any of the ways conventionally employed for impregnating such relatively inert carrier materials with solutions of the soluble compounds of the desired promoter. While aqueous solutions are to be preferred for practical reasons, other solutions such as alcoholic solutions or ammoniacal solutions may be used. A concentrated solution of just sufficient volume to wet the carrier material may be used, or a large volume of a more dilute solution may be used. The excess solution in the latter case may be drained from the carrier material or it may be evaporated in the presence of the carrier material to increase the amount of material impregnated. The impregnation may be carried out under vacuum or under pressure, or under a combination of vacuum and pressure. If, due to the solubility of the metal compound and/or the nature of the carrier material it is not possible to incorporate the desired amount of metal in one impregnation, the material may be dried after the first impregnation and the impregnation repeated until the desired amount of metal is incorporated. While other metal compounds such as the soluble sulphates may be used, it is preferable to employ the soluble nitrogen compounds of the metals. These compounds such as the ammonium salts, nitrates and nitrites, are easily decomposed by heating to quite moderate temperatures to give the corresponding oxides.

The critical factor in this step is the amount of metal or combination of metals incorporated. If either too much or too little of the material is incorporated the resulting pellets do not have the exceptional mechanical strength obtainable by the method of the invention. The amount of metal promoter to be incorporated in this step is dependent solely upon the concentration of metal promoter desired in the finished catalyst and is adjusted in any one of the known manners (e. g., by controlling the concentration of metal in the solution or the amount of the impregnated solution) such that when the specified amount of metal is incorporated in Step 4, to be described, the pellets contain the desired final amount of metal promoter. This will become clearer after consideration of the critical features of Step 4.

Step 3

After the relatively inert carrier material has been impregnated with a suitable amount of the desired metal promoter in the form of a soluble compound decomposable by heating, the impregnated mixture is dried and then calcined.

The calcination is carried out in the conventional manner to convert the impregnated compound or compounds to the corresponding metal oxide or oxides. It will be appreciated that in some cases the oxides may react to some extent to form compounds but this is a secondary reaction which is usually difficult if not impossible to recognize and is of no importance as far as the method is concerned. For example, a mixture of ammonium tungstate and nickel nitrate may upon calcination form a certain amount of a mixed oxide ($NiO.WO_2$). Also, in some cases, a part of the impregnated compound may react with the relatively inert carrier to form some mixed oxides, e. g., $FeO.Al_2O_3$. In the foregoing and in the following we refer to the metals or the metal oxides in full realization that in actuality other compounds may exist. The minimum calcination temperature is the temperature of decomposition of the impregnated compound or compounds and this may be ascertained in any particular case by referring to the chemical handbooks. It is preferred to effect the decomposition rather rapidly and in order to hasten the decomposition, temperatures somewhat above the minimum decomposition temperature are preferred. On the other hand, no advantage is gained in going to very high temperatures. Temperatures in the order of 250° C.–400° C. are quite suitable in nearly all cases but somewhat lower temperatures may be applied in some cases and higher temperatures up to about 900° C. may be employed if desired. It is desirable, although not essential, to flush the material with a gas such as nitrogen or air during the calcination to remove the vaporous products of decomposition. The calcination is preferably continued until the impregnated compound is completely decomposed, but it is preferable not to continue the calcination beyond this point. Thus, it is desirable to discontinue the calcination as soon as the evolution of decomposition products ceases.

Step 4

After the above-described calcination step the material is impregnated with a further specific amount of the catalytically active promoter or mixture of catalytically active promoters. As in Step 2, any of the conventional impregnation techniques may be applied and the same techniques are preferred.

The amount of metal or metals incorporated in this step is critical. The optimum amount depends somewhat upon the total amount of promoter used, the nature of the promoter, and the nature of the carrier, but is between about 8 and 12 parts by weight of the metal (i. e., calculated as the metal) based upon 100 parts of the relatively inert carrier material. When the surface of the carrier material is low, e. g., quartz powder, the optimum concentration is somewhat lower than when using a carrier of high surface area, e. g., activated carbon. While the stated concentrations are optimum, it will be appreciated that some variation from the optimum value is permissible. The concentration is quite critical, however, as will be seen from the curves shown in the accompanying drawing, to be described, and consequently the amount of metal impregnated should not deviate from the optimum amount by more than about 4 parts by weight.

Knowing the concentration of the catalytically active promoter desired in the finished catalyst, the amounts of metal to be impregnated by Steps 2 and 4 can be easily calculated. By way of example, if a catalyst containing 28 parts of chromium and 4 parts of copper per 100 parts of carrier is desired, the impregnation is adjusted in the known ways to incorporate from about 17.5 parts to about 19.2 parts of chromium and from about 2.5 parts to about 2.8 parts of copper per 100 parts of the carrier. After calcining to convert the chromium and copper to the oxides, the material is impregnated in Step 4 with such amounts of chromium and copper as to incorporate between about 8.75 parts and 10.5 parts of chromium and from about 1.25 parts to about 1.5 parts of copper. Thus, of 32 parts of total metal about 20 to 22 parts are incorporated in the first impregnation and the remaining 10 to 12 parts are impregnated in the second impregnation. In order that the amount of material impregnated may be accurateely known without making trial experiments the desired amounts of the metal compounds may be dissolved in such an amount of water that the entire solution is taken up by the solid, or if more water is used, the solution may be evaporated in contact with the carrier material so that the entire amount of material used is incorporated.

Step 5

After the impregnation of Step 4 the solid is dried under conditions to preclude the decomposition of the impregnated soluble metal compound. The drying may be effected by simply allowing the material to sit for a time in open trays, but it is preferred to hasten the drying by passing the material through a heated oven or kiln, preferably while passing a current of air. Thus, for example, air may be heated to around 90° C. and passed through or over the moist material. It is only necessary to dry the material sufficiently to allow it to be pelleted. The material does not need to be bone dry.

Step 6

The pelleting of the impregnated powder is carried out by pressing the powder into particles of the desired size and shape in the usual way. The use of a pelleting machine such as the well known Stokes type is preferred. In general, it is desirable to incorporate a small amount, usually less than 5%, of a lubricant such as flaked aluminum, graphite, stearic acid, or the like. The lubricant, if any, may remain in the finished catalyst, or it may be removed by a subsequent treatment if desired.

Step 7

After the pellets are formed they are calcined to convert the water soluble metal compound incorporated in Step 4 to the oxide. This calcination may be carried out in the manner described for Step 3. It is desirable, however, to adjust the temperature so that the decomposition takes place at a slow rate and extends over several hours.

It will be seen from the above that the present method depends not only upon the proper sequence of the steps, but also upon the details, and in particular upon the amounts of the catalytic promoter impregnated by Steps 2 and 4. Thus, the total amount of active promoter desired in the finished pellets is proportioned between the Steps 2 and 4 such that the desired critical amount is incorporated in Step 4.

When the catalyst pellets are prepared in the prescribed sequence of steps following the precautions noted, pellets of exceptional mechanical strength are produced even when incorporating high concentrations of the catalytically active promoter. This allows exceptionally active catalysts to be prepared by the preferred impregnation procedure rather than having to resort to the necessity of precipitating the active catalytic agent, e. g., nickel carbonate, onto the carrier or mixing the powdered ingredients. By impregnating the carrier material with soluble compounds of the promoter the promoter is evenly distributed over the surface of the carrier in its most extended and highly active form; when the metal is precipitated on the carrier, the promoter is largely in the form of clumps or large aggregates having little co-action with the carrier surface.

Another important advantage of the present method is that it allows active and strong catalyst pellets to be made using various carrier materials which are exceptionally desirable catalytically but could not be used heretofore because they invariably gave pellets of poor mechanical strength. A particular example of such a material is substantially pure alpha alumina. Alpha alumina (to be distinguished from activated alumina) is a particularly excellent carrier for certain types of catalysts and is widely used. However, as presently used, the pellets are formed with a ceramic binding material and then sintered prior to incorporating the catalytically active agent. The bonding material being of relatively low melting point, contains appreciable amounts of sodium or other alkali metal which gradually poisons the catalyst. This is well known, but as far as we are aware it has never before been possible to produce mechanically strong catalyst pellets consisting only of substantially pure alpha alumina powder in which the desired catalytically active promoter is incorporated by impregnation. The process of the invention is of course not limited to the use of alpha alumina as a carrier, but is of general application. Examples of a few typical carrier materials which may be applied are: finely powdered aluminum, silica gel, gamma alumina, asbestos, diatomaceous earth, magnesia, bone char, zirconia, aluminum phosphate, zinc alumina, spinel, bauxite and pumice. Many more could be mentioned.

The described method is applicable for the production of catalysts containing any of the catalytically active metals or mixtures thereof that exist in the form of water soluble compounds decomposable to the metal oxide by heating. The method is well suited for the production of catalysts containing high concentrations of heavy metal promoters, and particularly the very desirable class of promoters consisting of the metals of the transition series. Examples of suitable promoting metals are Ti, U, Cr, Mn, Fe, Co, Ni, Cu, Zn, Mo, Pd, Ag, Cd, Sn, Sb, W, Pt, Bi, Th, the rare earth metals, and various mixtures thereof. The method is suitable and advantageous wherever it is desired to incorporate above about 10 parts of the promoter per hundred parts of the carrier, but it is particularly advantageous when preparing catalyst pellets having above about 20-25 parts of the promoter. On the other hand, at very high concentrations of promoter, it is impossible for the surface of the carrier material to accommodate all of the promoter applied. The co-action, therefore, drops off and the activity of the catalyst approaches that of the pure catalytic promoter. There is, therefore, usually little or no advantage to be gained in going to concentrations of promoter above about 50% by weight (calculated as the metal). However, strong pellets of impregnated catalyst having above 50% by weight active promoter can be prepared by the method if such pellets should be desired.

It is customary to designate the concentration of promoter in terms of the metal or mixture of metals used. This is due to the fact that it is often difficult or impossible to know exactly in what form the metal exists in the finished catalyst. Thus, the exact state of oxidation, sulfurization, reduction, or the like, usually cannot be accurately known, and in many cases a certain amount of interaction may take place between the active promoter and the surface of the carrier material. While I refer to the active promoter as the metal, it is to be understood that the impregnated promoter may exist in any desired catalytic form. Thus, after the final calcination treatment the promoter metal or mixture of metals usually exists in an oxide form. The catalyst pellets may be used as such or they may be given a subsequent treatment to convert the oxides into some other more desirable catalytic form. For example, the promoter may be partly or completely reduced to the metal or converted to the sulfide, halide, phosphate or the like, by known suitable treatments.

*Example I*

In the preparation of a cobalt-molybdena-alumina catalyst containing the cobalt and molybdenum in an atomic ratio of 1:5, a commercial granular activated alumina (gamma alumina) is used. The highly porous alumina, after drying at 500° C., contains about 3% water. This alumina is impregnated with an aqueous solution of ammonium molybdate and cobalt nitrate and then dried and calcined in the usual manner. If the total amount of metal incorporated is low (in the order of 4-8 parts per 100 parts of alumina) the resulting granules have a satisfactory mechanical strength. If the granules are pulverized to 30-70 mesh (ASTM) and pelleted into 4 x 5 mm. cylindrical pellets using 3% graphite as a lubricant, the pellets have a crushing strength of less than 1 kg. If on the other hand, the granules are pulverized and pelleted in the same way prior to the final calcination, the resulting pellets, after calcination have a good mechanical strength. On the other hand, it is attempted to produce more active catalyst pellets by the incorporation of larger amounts of cobalt and molybdenum, the pellets produced in this manner are of very inferior mechanical strength.

In accordance with this invention catalyst pellets of exceptional mechanical strength are produced, having high concentrations of cobalt and molybdenum, by the following method. The granules of activated alumina, after drying at 500° C., are impregnated using a solution of ammonium molybdate and cobalt nitrate to incorporate a pre-determined amount of cobalt and molybdenum. The granules are then dried at 120° C. for four hours and calcined at 370° C. in a stream of nitrogen for two hours. Then 8.3 parts of ammonium molybdate are dissolved in 37.4 parts of hot water. Upon cooling, 5.2 parts of cobalt nitrate containing 10.7% cobalt are added to the solution. Then 69.1 parts of the above catalyst material are impregnated with the solution (the solution is all absorbed) and the material is then dried for four hours at 120° C. The granules are then pulverized to 30–70 mesh (ASTM), mixed with 3% graphite, and pelleted into 5 x 4 mm. cylindrical pellets. The pellets are slowly heated to 370° C. in a stream of nitrogen and maintained at the temperature for two hours until the decomposition is complete. The resulting pellets have a crushing strength of about 12 kg. As will be seen, about seven parts of cobalt plus molybdenum are incorporated per 93 parts of the alumina in the last impregnation step. The remaining amount to give the desired final concentration is incorporated in the first impregnation. If more or less cobalt plus molybdenum is incorporated in this second impregnation the resulting pellets are not as strong and, in fact, are very weak if the variation is material.

*Example II*

White Surinam bauxite is heated for two hours in air at 500° C. and subsequently pulverized. Then 360 parts of this powder is impregnated with a solution of 1042 parts of nickel nitrate (6 aq.) and 102 parts of chromium nitrate (9 aq.) in 100 parts of water. The product obtained is heated for 12 hours at a maximum temperature of 300° C. after which the escape of nitrous vapor ceases. After being cooled and pulverized the product is impregnated with a solution of 116 parts of nickel nitrate (6 aq.) in 250 parts of water. The impregnated mass is dried for 19 hours at 110° C., sifted, and after the addition of 1% graphite, compressed into 3 x 5 mm. pellets. The pellets are then heated for 30 hours at 300° C. in a stream of nitrogen. The pellets produced in this manner have a strength of 10 kg.

When the calcined bauxite is impregnated with a solution of 1158 parts of nickel nitrate and 102 parts of chromium nitrate in one operation the pellets have a strength of 1 kg. If in this latter case, 250 parts of water are added to the impregnated and dried material prior to forming the pellets, and the material is then re-dried at 110° C. and compressed into pellets, the resulting pellets after calcination likewise have a maximum strength of only 1 kg.

*Example III*

A series of catalysts is prepared using powdered alpha alumina as the carrier and containing different amounts of impregnated nickel. The alumina is impregnated in each case with an aqueous solution of nickel nitrate, dried, pelleted and calcined, as described. As will be seen from the left hand branch of the curve in the graph in the accompanying drawing, fairly strong pellets are obtained at very low concentrations of nickel, but the strength of the pellets rapidly declines as the concentration of nickel is increased until at a concentration of about 67 parts of nickel per 100 parts of alumina the pellets have no strength at all.

A second series of catalysts is prepared by impregnating the alpha alumina in the same manner with about 67 parts of nickel after which the material is dried and calcined as described. Portions of the calcined material are then impregnated again with various amounts of nickel nitrate after which the portions are dried, pelleted and then calcined for three hours at 300° C. in a stream of nitrogen. As will be seen from the right hand branch of the curve of the graph illustrated in the accompanying drawing, the strength of the resulting pellets passes through a sharp maximum when about 8 parts of nickel are impregnated by the second impregnation. As will be seen, exceptionally strong catalyst pellets containing about 76 parts of nickel per 100 parts of alumina are prepared by the described method.

The crushing strength of the pellets is determined by crushing them in a radial direction between two steel plates.

I claim as my invention:

1. In the preparation of impregnated catalysts in pelleted form containing high concentration of catalytically active heavy metal promoter in combination with a relatively inert carrier material, the combination of steps which comprises dissolving the desired amount of a compound of the heavy metal promoter decomposable to the oxide by heating in two portions (A and B) of a solvent in such a manner that portion A contains from about 8 to about 12 parts of the heavy metal promoter per 100 parts of the relatively inert carrier and portion B contains the remaining amount of said heavy metal promoter, impregnating the relatively inert carrier with the said portion B, drying and calcining the resulting impregnated carrier at a temperature sufficient to decompose the impregnant compound, impregnating the resulting calcined material with said portion A, drying the resulting impregnated material at a temperature below that causing decomposition of the impregnant compound, pressing the resulting material into pellets, and calcining said pellets at a temperature sufficient to decompose the impregnant compound.

2. Process according to claim 1 in which the impregnant metal compound is a water soluble compound containing nitrogen.

3. Process according to claim 1 in which the impregnant metal compound is a metal nitrate.

4. Process according to claim 1 in which the impregnant catalytically active metal consists predominantly of nickel.

WILLEM FREDERIK ENGEL.

REFERENCES CITED

The following references are of record in the file of this patent:

UNITED STATES PATENTS

| Number | Name | Date |
|---|---|---|
| 2,242,627 | Strickland | May 20, 1941 |
| 2,400,025 | Scharmann | May 7, 1946 |
| 2,422,372 | Smith et al. | June 17, 1947 |
| 2,470,092 | Corson et al. | May 17, 1949 |
| 2,474,440 | Smith et al. | June 28, 1949 |
| 2,508,014 | Davidson | May 16, 1950 |